Patented July 23, 1935

2,009,134

UNITED STATES PATENT OFFICE 2,009,134

PROCESS FOR MAKING A FOOD PRODUCT

William P. M. Grelck, Baltimore, Md.

No Drawing. Application October 25, 1933, Serial No. 695,164

2 Claims. (Cl. 99—5)

Green legumes, green cereals and green forage plants are most highly digested in that state by the animal mechanism, as well as fresh or wet brewers and distillers' grains or fresh fish and fresh fish offal. To preserve these foodstuffs, they are usually dried and it is due to the drying process that the degree of digestibility is considerably reduced and the so-called life giving food factors or vitamins are largely destroyed.

Fresh green legumes like soy beans or alfalfa or fresh green cereals like barely or oats, green forages like cabbage, and wet or fresh brewers and distillers' grains are valuable animal foods. They contain in this state the greatest amount of food factors or vitamins and are frequently preserved in the form of silage for animal feeding purposes and are plant foods. Among the food stuffs of animal origin, fresh fish and bony fish offal are available in great abundance and on account of their highly perishable nature, they frequently are subjected to a drying process by exposure to furnace heat, which destroys a large percentage of valuable nutritious matter and thereby reduces their food value to a great extent. Fish material contains a large percentage of bony matter, whereas plant food stuffs contain a large percentage of fibrous matter, and upon drying this fish material it is most difficult and expensive to grind it to a meal after drying it, whereas it is much more economical to grind this fish material while fresh and in its natural state, and the plant foods in their green state, and then drying the same to a semifluid paste, atomizing or spraying the paste from the top of a vertical drying chamber into the drying chamber against a stream of hot air or gas rising within the drying chamber from a bottom inlet, which arrangement is more fully described in my application for United States Letters Patent, filed April 1, 1930 under Serial No. 440,800. Fresh fish or fresh fish offal as well as green fodder plants and wet brewers and distillers' grains contain normally about 75% moisture, which is sufficient moisture to form a semifluid paste when ground fine.

My invention relates to the grinding of fresh fish, fresh fish offal, green legumes, green cereals, green forage plants and wet brewers and distillers' grains to a cream-like semi-fluid paste, then spraying or atomizing the paste into the top of a vertical chamber, constructed of sufficient height, against a current of hot air or gas, and exposing the sprayed or atomized food material a sufficient length of time to the hot air or gas by drop in the vertical drying chamber so that the bony or fibrous particles are fully dried. By test I find that a vertical chamber 70 to 80 feet high, round or square, of about 12 feet diameter or sides, will give the sprayed or atomized fish or plant paste sufficient time to dry when sprayed from the top into the chamber against the rising hot air or gas which enters near the bottom of the chamber and escapes through the top of the chamber. The dried solid food material falls to the bottom of the chamber. The chamber may have a funnel shaped extension so that the dried food material is collected below the entrance of the hot air or gas. The height of the chamber produces sufficient natural draft, in fact the action is similar to that of a smoke stack. The hot air or gases as they travel from the bottom inlet upwards, absorb gradually the moisture from the sprayed or atomized material as it drops so that the hot air or gases are practically saturated with moisture when escaping from the top of the drying chamber. This method of drying is highly economical and preserves the natural qualities of the food material to be dried to the fullest extent possible because the lowest temperature is maintained at the top outlet of the chamber and thereby guards the food material to be dried against destruction by exposure to excessive heat. This condition is maintained throughout the drying chamber as the temperature increases towards the bottom of the drying chamber while the moisture content of the food material to be dried, decreases. By this action the natural qualities of the food material are greatly preserved.

A further object of my invention relates to the grinding of finely divided particles of whole fish or bony fish material or fish offal, green legumes, green cereals, green forage plants, or wet distillers or brewers' grains, and comminuting the finely ground bony fish material or fibrous plant material with the fleshy or juicy material of the same to a cream like semifluid or paste.

A further object of my invention is, after the fresh fish or bony fish offal or green legumes or green cereals or green forage plants or wet brewers or distillers' grains are ground to a cream like semifluid paste, to remove its surplus moisture by spraying or atomizing the same against a stream of hot air or gas in a vertical drying chamber, which is constructed of sufficient height to allow a drop of several seconds for the sprayed or atomized food material so that its bony or fibrous particles are fully dried. The dried food material is then removed from the bottom of the drying chamber, packed in meal form and sold as a food.

In practicing my invention, I proceed for example as follows: The raw fresh food material to be dried may be whole fish, bony fish offal or fresh green plants like alfalfa, soy beans, barley, cabbage or other green fodder plants or wet brewers or distillers' grains. The raw food material is ground fine to a cream like semifluid paste by means of an attrition mill or other suitable grinding machine. In case the raw food material has been exposed to air or has lost part of its natural moisture content previous to grinding the same, it may be moistened somewhat to bring its moisture content back to normal. Before feeding the raw food material into the attrition mill, it is passed through a chopper or cutter and chopped or cut so that it can readily be fed by conveyer or otherwise into the hopper of the attrition mill. The grinding plates of the attrition mill are set sufficiently tight so that the bony or fibrous food material, as the case may be, is discharged in semifluid paste form so that it can readily be drawn by suction into a pump. The pump forces the semifluid paste through a suitable spray or atomizer or a plurality of the same, fitted at the top of the drying chamber. The drying chamber is of the vertical type, round or square, about 70 to 80 feet high, about 12 feet diameter or sides, well insulated, fitted with a hot air inlet at or near the bottom so that the hot air or gases may rise by natural draft against the ground food material sprayed or atomized from the top of the drying chamber downward so that the hot air or gas absorbs the moisture of the sprayed or atomized food material gradually as it rises and escapes saturated with moisture through an opening at the top of the drying chamber. The amount of hot air or gas drawn or forced through the drying chamber and the amount of the finely ground food material sprayed against the hot air or gas rising within the drying chamber is so timed and regulated that practically all of the moisture from the sprayed or atomized food material is absorbed by the rising hot air or gas when it reaches the bottom of the drying chamber. The bottom of the drying chamber may be fitted with a funnel shaped extension so that the dried food material is collected just below the hot air or gas inlet. The height of the drying chamber is such that the bony or fibrous particles are exposed a sufficient length of time while dropping from the top to the bottom of the chamber against the current of hot air or gas so that practically no moisture is retained. It will be noted that the materials which have been finely comminuted, contain bony particles when fish material is used and fibrous particles when green plant material is used and said bony or fibrous particles require a longer period for drying than the meaty or juicy material. The heated column of air or gas which passes upwardly through the drying chamber, has its highest temperature at the lower end of the drying chamber where said hot air or gas emerges from an inlet placed somewhat about the bottom of it. At the upper end of the drying chamber where the materials are sprayed or atomized, the temperature is lowest due to the evaporation and subsequent absorption of heat by the moisture in the sprayed or atomized material. The moisture saturated hot air or gas may be screened when passing out of the drying chamber to remove all particles of dried material and return said particles to the collected dried material at the bottom of the drying chamber. The dried food material collected at the bottom of the drying chamber is then removed by a suitable conveyer or other arrangement, then passed through a pulverizer, and is then packed in bags or other suitable containers, to be sold as a food.

I claim:

1. The method of preparing finely divided particles of fish or bony fish offal, which comprises finely comminuting said bony material, including the meaty juices, to provide a cream like semifluid paste, spraying or atomizing the same in contact with a column of heated air or gas into a confined space, the heated air or gas being supplied at a point considerably below the point where the semifluid paste is sprayed or atomized into the rising column of heated air or gas, so that the particles in process of drying of said fish or bony fish offal will fall through the heated air or gas for completing the drying of said particles, the particles being progressively dried during their fall through the column of heated air or gas and emerging from said column where the heated air or gas has the highest temperature, then collecting the dried particles.

2. The method of preparing finely divided particles of green fodder or forage plant material or green cereals or fibrous wet offal from grain cereals, forage or fodder plants, which comprises finely comminuting said fibrous material or fibrous offal, including its juices, to provide a cream like semifluid paste, spraying or atomizing the same in contact with a column of heated air or gas into a confined space, the heated air or gas being supplied at a point considerably below the point where the semifluid fibrous paste is sprayed or atomized into the rising column of heated air or gas so that the particles in process of drying of said fibrous material will fall through the heated air or gas for completing the drying of said particles the particles being progressively dried during their fall through the column of heated air or gas and emerging from said column where the heated air or gas has the highest temperature, then collecting the dried particles.

WILLIAM P. M. GRELCK.